(12) United States Patent
Yip

(10) Patent No.: US 6,425,321 B1
(45) Date of Patent: Jul. 30, 2002

(54) JUICE EXTRACTOR

(76) Inventor: Chung Lun Yip, 3rd Floor, Blocks A & C, King Yip Factory Building, No. 59 King Yip Street, Kwun Tong, Kowloon (HK)

( * ) Notice: Subject to any disclaimer, the term of this patent is extended or adjusted under 35 U.S.C. 154(b) by 0 days.

(21) Appl. No.: 10/022,816

(22) Filed: Dec. 18, 2001

(30) Foreign Application Priority Data

Jan. 10, 2001 (CN) .......................................... 01214880

(51) Int. Cl.[7] .............................. A23N 1/02; A23N 1/00; A47J 43/044; A47J 43/25; A23L 2/12

(52) U.S. Cl. ............................... 99/510; 99/495; 99/509

(58) Field of Search .................. 99/348, 495, 509–513; 100/117, 145, 147, 148; 241/37.5, 92, 93, 260.1, 282.1, 169.1; 366/197–199, 205, 306, 318, 601; 210/173, 174; 426/481, 482, 489, 518, 616

(56) References Cited

U.S. PATENT DOCUMENTS

| | | | | |
|---|---|---|---|---|
| 797,394 A | * | 8/1905 | Roberts | 100/148 X |
| 2,109,398 A | * | 2/1938 | McNitt | 100/148 |
| 2,315,028 A | * | 3/1943 | Thomas | 100/121 X |
| 4,325,643 A | * | 4/1982 | Scott et al. | 366/318 X |
| 4,363,265 A | * | 12/1982 | Tanioka et al. | 99/513 X |
| 4,385,553 A | * | 5/1983 | Ihara et al. | 99/510 |
| 4,429,626 A | * | 2/1984 | Ihara et al. | 100/117 X |
| 4,440,074 A | * | 4/1984 | Ihara et al. | 99/510 |
| 5,156,872 A | * | 10/1992 | Lee | 99/495 X |
| 5,249,514 A | * | 10/1993 | Otto et al. | 99/510 |
| 5,638,745 A | * | 6/1997 | Lokhandwala et al. | 99/495 X |
| 5,651,305 A | * | 7/1997 | Bushman et al. | 99/510 |

* cited by examiner

Primary Examiner—Timothy F. Simone
(74) Attorney, Agent, or Firm—Ladas & Parry

(57) ABSTRACT

A juice extractor includes an auger tube having an auger rotatably mounted within it. The auger has a spiral formation of decreasing pitch toward a grinding end. At the grinding end, a grinding surface bears against a grinding plate to extract more juice from fruit or vegetable sediment. Sediment is delivered through an outlet, whereas juice is deliver from a separate outlet to a cup having a special shape.

12 Claims, 1 Drawing Sheet

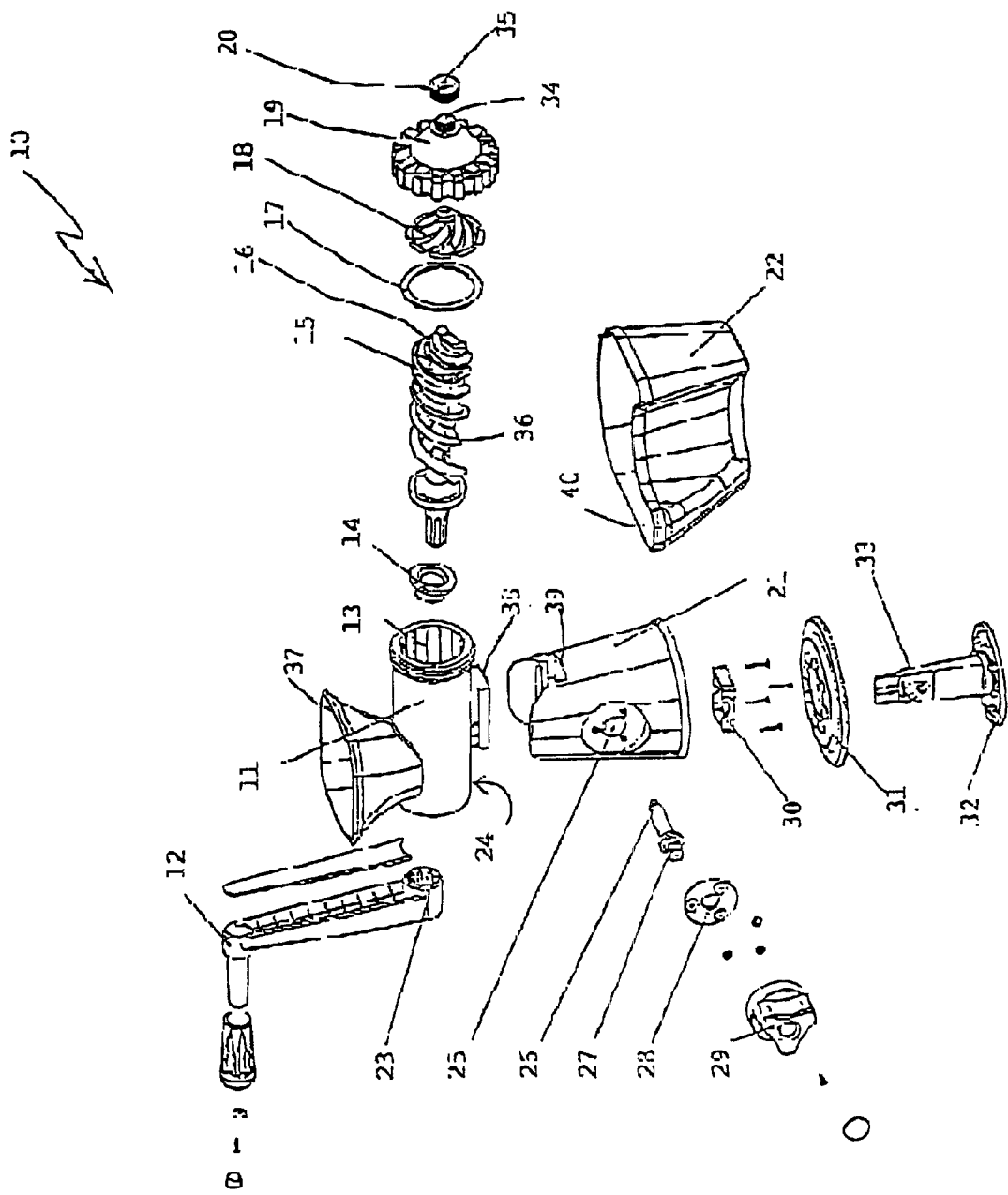

JUICE EXTRACTOR

FIELD OF THE INVENTION

The following invention relates to a juice extractor. More particularly, although not exclusively, the invention relates to a juice extractor having an auger which drives fruit or vegetable sediment toward a grinding mechanism for pulverising the sediment to extract more juice therefrom.

Known juice extractors can comprise various rotatable mechanisms for extracting juice from fruit or vegetables. For citrus juice, the fruit can be cut into halves and each half pushed down upon a rotating conical/hemispherical surface. Such devices not only remove juice from the fruit but also mix in with the juice, the fibrous fruit particles and seeds. These particles are included with the extracted juice to be embibed.

It might be desired to provide a natural fruit or vegetable juice with a reduced quantity of residue therein.

OBJECT OF THE INVENTION

It is an object of the present invention to provide a juice extractor in which fruit or vegetable sediment is better separated from the juice itself.

It is a further object of the present invention to provide and improved juice extractor that extracts more juice from fruit or vegetable sediment.

It is yet further object of the present invention to provide an efficient juice extractor for mounting temporarily on a kitchen bench.

It is a general object of the present invention to overcome or substantially ameliorate the above mentioned disadvantages.

DISCLOSURE OF THE INVENTION

There is disclose herein a juice extractor comprising:
  an auger tube having an inlet for receiving fruit and/or vegetable pieces to be juiced and an outlet for extracted juice,
  an auger rotatably mounted within the tube and driven from outside the tube to rotate,
  a grinder at one end of the auger for receiving partly juiced sediment and grinding the sediment for extracting more juice therefrom, and
  a ground sediment outlet separate from the juice outlet.

Preferably the auger includes a spiral formation having a pitch which decreases toward the grinder.

Preferably the grinder includes a grinding surface on one end of the auger and a grinding plate fixed within the auger tube, the grinding surface turning against the grinding plate upon rotation of the auger.

Preferably the grinding surface has a spiral formation and the grinding plate has a spiral formation in an opposite direction to the spiral formation of the grinding surface.

Preferably a residue outlet cap is temporarily secured to the auger tube.

Preferably the grinding plate is fixed within the residue outlet cap.

Preferably the grinding surface and grinding plate are substantially conical in form.

Preferably the residue outlet cap is substantially conical in form.

Preferably the auger tube has internal longitudinal grooves formed therein.

Preferably the auger has a splined end onto which a handle having a splined socket is received.

Preferably the auger tube includes a formation and the juice extractor also includes a base to which the formation is received.

Preferably the base is temporarily mounted upon a flat surface by a suction fastener.

BRIEF DESCRIPTION OF THE DRAWINGS

A preferred form of the present invention will now be described by way of example with reference to FIG. 1 which is a schematic parts-exploded perspective illustration of a juice extractor.

DESCRIPTION OF THE PREFERRED EMBODIMENT

In the accompanying drawing there is schematically depicted in a parts-exploded diagram a juice extractor 10.

Juice extractor 10 includes an auger tube 11 having an inlet hopper 37 as shown.

An auger 15 is fitted within the auger tube 11 and has a splined driving end fitted within a splined socket 23 of a handle 12. That is, the driving end of the auger passes through an opening in one end of the auger tube 11 to receive externally of the tube 11 the splined socket 23. Rotation of handle 12 causes rotation of the auger 15 within the auger tube 11.

Extending longitudinally along the inner surface of the auger tube 11 are grooves 13. These grooves 13 might be spaced the whole way around the inner surface of the tube 11 or just part way therearound. If the grooves do not extend the whole way around the inner surface of the tube 11, they might be provided just in the lower part thereof.

To centrally mount the auger 15, a bearing 14, typically formed of nylon fits around the splined end of the auger to locate the auger centrally of the aperture (not shown) through which the splined end passes to receive the splined socket 23. The splined end of the auger can be made of a different material than the main part of the auger itself. Where the auger is of plastics material, the splined end might be of stronger or higher density plastics. This piece might be adhered or plastics welded to the main part of the auger.

A residue outlet cap 19 is threaded onto the end of the auger tube 11. The residue outlet cap 19 has a conical form, to the inside of which there is received a metal grinding plate 18. Grinding plate 18 has helical indentations pressed thereon which correspond with similar shaped helical formations (not shown) moulded on the inside surface of the conical cap 19. These helical formations mate with those of the grinding plate to prevent the grinding plate 18 from spinning within the cap 19. A sealing ring 17 fits within the cap 19 and presses against the end of the auger tube 11 when the cap 19 is threaded thereon. The residue outlet cap 19 has a tip with a through-passage 34. This tip is externally threaded to receive a residue tip outlet 20 having a small aperture 35 therein. Ground residue passes through the openings 34 and 35 to be received by a cup for example.

The auger 15 has a conically formed metallic grinding surface 16 adhered to its end. The grinding surface 16 has spiral shaped formations extending in a direction opposite to the direction of the formations formed on the grinding plate 18. Plate 18 and surface 19 are typically metallic, whereas the other component of the auger and housing are typically formed of moulded plastics material. The auger tube might be light is transmissive or transparent. The auger 18 has a spiral 36 extending about its exterior surface from one end to the other. The pitch of the spiral decreases toward the grinding surface 16. That is, beneath the hopper 37, the pitch of the spiral is high, whereas the pitch decreases toward the residue outlet end.

The auger tube 11 has a lug 38 at its bottom surface to be received within a formation 39 at the top of a base 21.

The base 21 is to be temporarily secured to a kitchen bench top by means of a suction fasting device therein.

The base 21, typically formed as a plastics moulding includes a shaft 26 having an eccentricity or cam located thereon. The shaft extends through an aperture 25. At the end of the shaft, there is provided a square head 27 that passes through a washer 28. Washer 28 is secured into a recess by screws. A dial 29 is attached to the square head 27 and extends partly into the recess in the base about the aperture 25. Within the base 29, there is provided a plate 30 which cooperates with a lifter 32. Lifter 32 has an upstanding leg through which there is formed a cam surface 33. The shaft 36 passes through the aperture about which the cam surface 33 is formed, such that upon rotation of the shaft 26 upon turning of dial 29, the lifter 32 lifts upwardly away from the bench top into the base 21. The lifter 32 bears against a diaphragm 31 formed of rubber for example and fixed at its periphery to the base. This diaphragm acts like a suction cup to hold the base 21 on to the bench top.

A specially shaped cup 22 sits on the bench top and partly surrounds the base 21. The cup 22 includes a juice receiving extension 40 which sits directly beneath the juice outlet 24.

In use, pieces of fruit and/or vegetable are inserted through the hopper 37 to the feed end of the auger tube 11. The handle 12 is rotated in a clockwise direction so as to cause the auger 15 to rotate within the tube 11. As a result, the fruit and/or vegetable pieces are caught by the spiral formation 36 to drive the pieces toward the grinding surface 16.

Due to the longitudinal grooves 13 against which the auger's spiral formation closely bears, the pieces do not simply rotate within the tube 11, but are forced toward the grinding surface 16. As the pitch of formation 36 decreases, the pieces are squeezed and extracted juice is caused to flow back to the outlet 24 to be received by the cup 22. As fibrous sediment and seeds for example are delivered to the grinding surface 16, they are pulverized between this surface and the grinding plate 18 against which the grinding surface turns. As the parts have spiral formations in opposing directions, an efficient crushing effect is achieved. Also, the pulverized pieces are driven toward the outlet apertures 34 and 35 and more juice is squeezed therefrom. Because aperture 35 is very small, nearly all of the juice from these pieces is driven back into the cylinder 11 to flow back to the juice outlet 24. To assist this flow, the bottom of the auger tube 11 can be inclined downwardly toward juice outlet 24.

It should be appreciated that modifications and alternations obvious to those skilled in the art are not to be considered as beyond the scope to the present invention.

For example, the cup 22 could be provided with two compartments, one for juice and the other for sediment received from the outlet 35. Also, instead of a manually operated handle, an electric motor, and possibly a reduction gearbox could drive the auger.

I claim:

1. A juice extractor comprising:

an auger tube having an inlet for receiving fruit and/or vegetable pieces to be juiced and an outlet for extracted juice, an auger rotatably mounted within the tube and driven from outside the tube to rotate, a grinder at one end of the auger for receiving partly juiced sediment and grinding the sediment for extracting more juice therefrom, and a ground sediment outlet separate from the juice outlet.

2. The juice extractor of claim 1 wherein the auger includes a spiral formation having a pitch which decreases toward the grinder.

3. The juice extractor of claim 1 wherein the grinder includes a grinding surface on one end of the auger and a grinding plate fixed within the auger tube, the grinding surface turning against the grinding plate upon rotation of the auger.

4. The juice extractor of claim 3 wherein the grinding surface has a spiral formation and the grinding plate has a spiral formation in an opposite direction to the spiral formation of the grinding surface.

5. The juice extractor of claim 1 wherein a residue outlet cap is temporarily secured to the auger tube.

6. The juice extractor of claim 5 wherein the grinding plate is fixed within the residue outlet cap.

7. The juice extractor of claim 3 wherein the grinding surface and grinding plate are substantially conical in form.

8. The juice extractor of claim 5 wherein the residue outlet cap is substantially conical in form.

9. The juice extractor of claim 1 wherein the auger tube has internal longitudinal grooves formed therein.

10. The juice extractor of claim 1 wherein the auger has a splined end onto which a handle having a splined socket is received.

11. The juice extractor of claim 1 wherein the auger tube includes a formation and the juice extractor also includes a base to which the formation is received.

12. The juice extractor of claim 11 wherein the base is temporarily mounted upon a flat surface by a suction fastener.

* * * * *